(12) United States Patent
Goto

(10) Patent No.: US 12,091,046 B2
(45) Date of Patent: Sep. 17, 2024

(54) DRIVING ASSISTANCE APPARATUS

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 270 days.

(21) Appl. No.: 17/688,394

(22) Filed: Mar. 7, 2022

(65) Prior Publication Data

US 2022/0306153 A1 Sep. 29, 2022

(30) Foreign Application Priority Data

Mar. 24, 2021 (JP) ................................. 2021-049393

(51) Int. Cl.
*B60W 30/095* (2012.01)
*B60W 60/00* (2020.01)

(52) U.S. Cl.
CPC .... *B60W 60/0011* (2020.02); *B60W 30/0956* (2013.01); *B60W 2420/403* (2013.01); *B60W 2554/4041* (2020.02); *B60W 2554/4046* (2020.02)

(58) Field of Classification Search
CPC ......... B60W 60/0011; B60W 30/0956; B60W 30/09
See application file for complete search history.

(56) References Cited

U.S. PATENT DOCUMENTS

| | | | |
|---|---|---|---|
| 10,037,036 B2* | 7/2018 | Nilsson | B60W 40/04 |
| 10,281,920 B2* | 5/2019 | Frazzoli | G08G 1/166 |
| 2008/0266168 A1* | 10/2008 | Aso | G08G 1/166 |
| | | | 342/70 |
| 2015/0066329 A1* | 3/2015 | Mielenz | B60W 30/143 |
| | | | 701/93 |
| 2018/0231974 A1* | 8/2018 | Eggert | B60W 60/0027 |
| 2018/0336787 A1* | 11/2018 | Ohnishi | H04W 84/00 |
| 2019/0315345 A1* | 10/2019 | Newman | B60W 50/14 |
| 2020/0192365 A1* | 6/2020 | Russell | G05D 1/0088 |
| 2020/0225669 A1* | 7/2020 | Silva | B60W 60/0011 |
| 2020/0310425 A1* | 10/2020 | Ghose | G08G 1/167 |
| 2021/0027629 A1* | 1/2021 | Tao | G08G 1/166 |
| 2021/0046924 A1* | 2/2021 | Caldwell | B60W 60/0027 |
| 2022/0315051 A1* | 10/2022 | Patel | G01S 17/89 |
| 2022/0388505 A1* | 12/2022 | Sharma Banjade | G08G 1/005 |
| 2023/0015466 A1* | 1/2023 | Jiralerspong | B60W 40/105 |
| 2023/0021615 A1* | 1/2023 | Inaba | F16D 61/00 |

FOREIGN PATENT DOCUMENTS

JP 2016-122308 A 7/2016

* cited by examiner

*Primary Examiner* — Dino Kujundzic
(74) *Attorney, Agent, or Firm* — Rimon P.C.

(57) ABSTRACT

A driving assistance apparatus is configured to assist in driving a vehicle and includes a combined-blind-area calculator and a driving-condition setter. The combined-blind-area calculator is configured to set potential vehicles in respective vehicle blind areas that are caused by multiple shrouds located around the vehicle and that are blind areas for the vehicle and calculate a combined blind area that is formed by at least two of potential vehicle blind areas that are caused by the multiple shrouds and that are blind areas for the respective potential vehicles. The driving-condition setter is configured to set multiple paths for moving the vehicle to a location outside the combined blind area and set a driving condition of the vehicle, based on any one of the multiple paths.

6 Claims, 12 Drawing Sheets

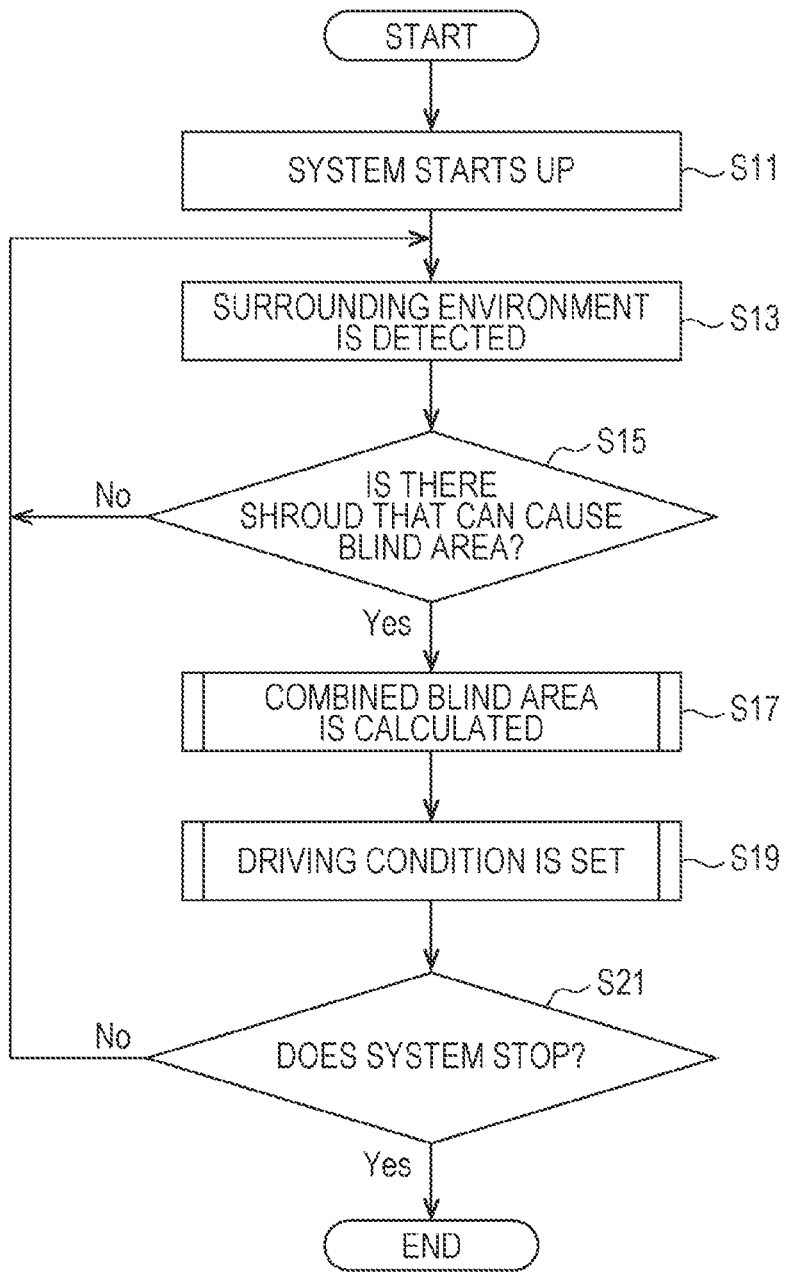

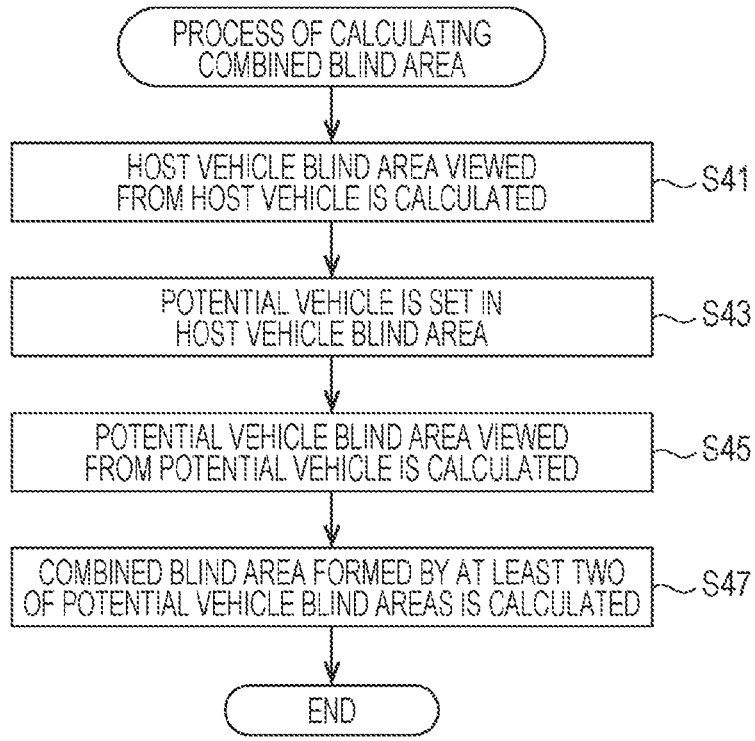
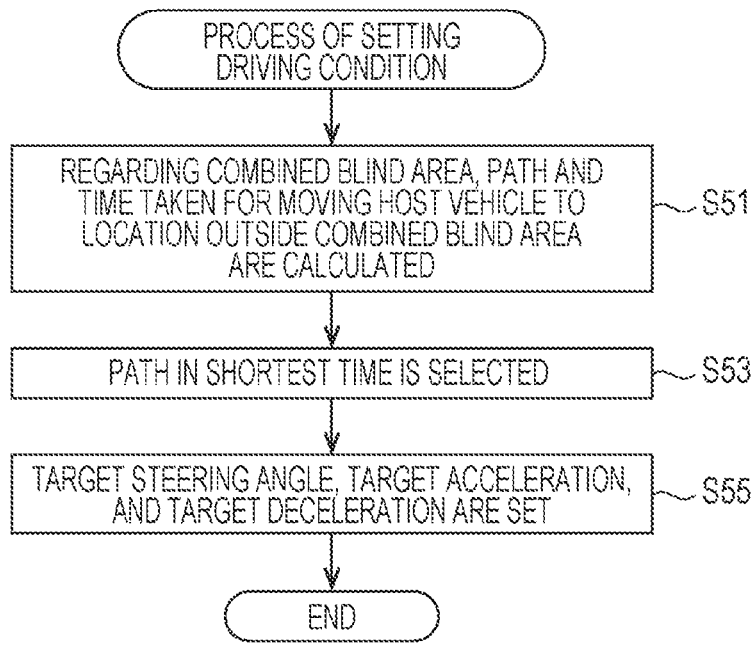

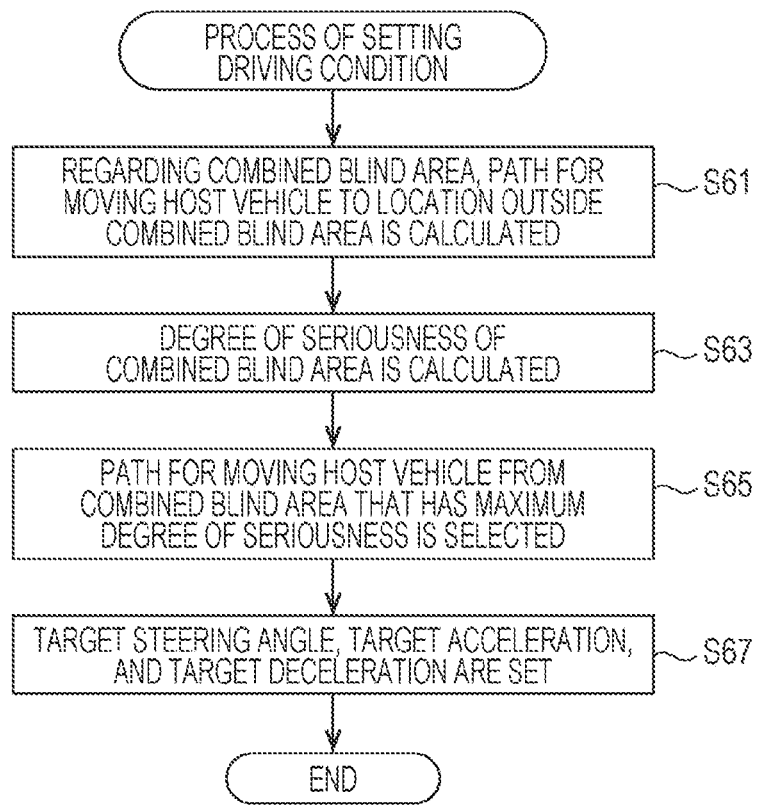
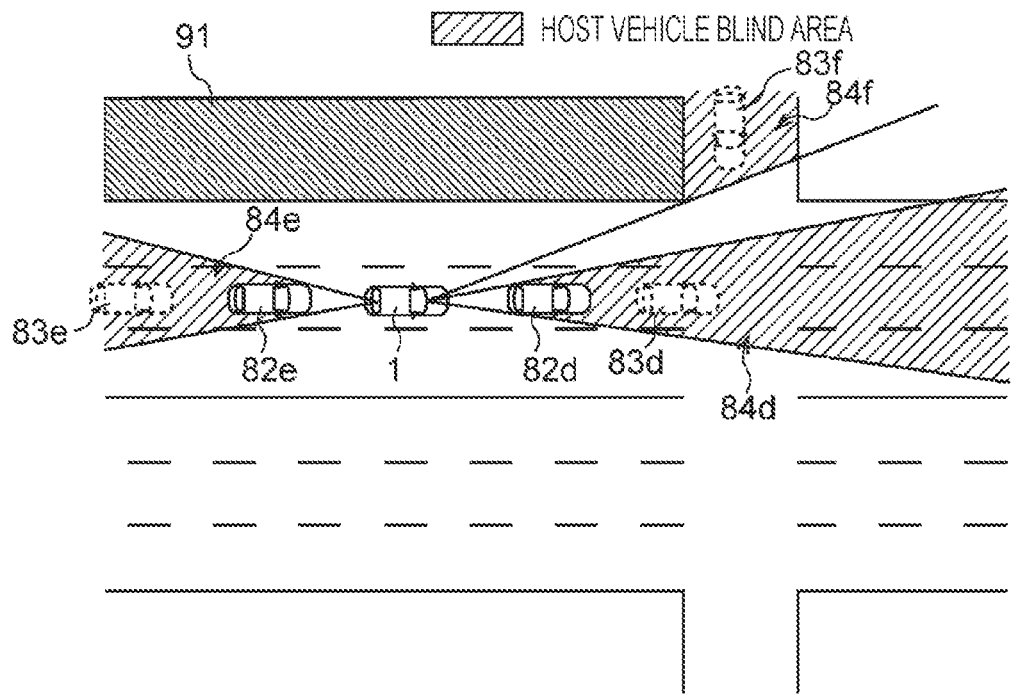

DRIVING ASSISTANCE APPARATUS

CROSS-REFERENCE TO RELATED APPLICATIONS

The present application claims priority from Japanese Patent Application No. 2021-049393 filed on Mar. 24, 2021, the entire contents of which are hereby incorporated by reference.

BACKGROUND

The disclosure relates to a driving assistance apparatus that assists in driving a vehicle so as to avoid a collision with a surrounding obstacle.

In recent years, a vehicle that has a function of driving assistance such as an autonomous emergency brake (AEB) has been increasingly used mainly in order to reduce traffic accidents. For example, a known apparatus detects an obstacle that is located around a host vehicle, based on information that is detected by an exterior camera that is included in the host vehicle and various sensors such as a light detection and ranging (LiDAR) sensor and assists in driving the host vehicle so as to avoid a collision between the host vehicle and the obstacle. As for the traffic accidents, however, a phenomenon such as sudden emergence from a blind area is difficult to avoid unless an accident is assumed in advance, and unless a preliminary action such as deceleration is taken.

In the case where a host vehicle travels in circumstances that include a blind area, a vehicle control apparatus that is proposed in, for example, Japanese Unexamined Patent Application Publication (JP-A) No. 2016-122308 can appropriately control the vehicle depending on the circumstances. For example, the vehicle control apparatus that is disclosed in JP-A No. 2016-122308 detects the blind area for the host vehicle, determines a relative priority of the course of a moving body that can emerge from the blind area and the course of the host vehicle, and outputs a control signal for the host vehicle, based on the determined priority.

SUMMARY

An aspect of the disclosure provides a driving assistance apparatus to be applied to a vehicle. The driving assistance apparatus is configured to assist in driving the vehicle. The driving assistance apparatus includes a combined-blind-area calculator and a driving-condition setter. The combined-blind-area calculator is configured to set potential vehicles in respective vehicle blind areas that are caused by multiple shrouds located around the vehicle and that are blind areas for the vehicle, and calculate a combined blind area that is formed by at least two of potential vehicle blind areas that are caused by the multiple shrouds and that are blind areas for the respective potential vehicles. The driving-condition setter is configured to set multiple paths for moving the vehicle to a location outside the combined blind area, and set a driving condition of the vehicle, based on any one of the multiple paths.

An aspect of the disclosure provides a driving assistance apparatus to be applied to a vehicle. The driving assistance apparatus is configured to assist in driving a vehicle. The driving assistance apparatus includes circuitry. The circuitry is configured to set potential vehicles in respective vehicle blind areas that are caused by multiple shrouds located around the vehicle and that are blind areas for the host vehicle. The circuitry is configured to calculate a combined blind area that is formed by at least two of potential vehicle blind areas that are caused by the multiple shrouds and that are blind areas for the respective potential vehicles. The circuitry is configured to set multiple paths for moving the vehicle to a location outside the combined blind area. The circuitry is configured to set a driving condition of the vehicle, based on any one of the multiple paths.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 3 is a flowchart illustrating a main routine of control processing that is performed by the driving assistance apparatus according to the first embodiment;

FIG. 4 is a flowchart illustrating an example of a process of calculating a combined blind area that is performed by the driving assistance apparatus according to the first embodiment;

FIG. 5 is a flowchart illustrating an example of a process of setting driving conditions that is performed by the driving assistance apparatus according to the first embodiment;

FIG. 12 is a flowchart illustrating an example of the process of setting the driving conditions that is performed by the driving assistance apparatus according to the second embodiment;

FIG. 13 illustrates the host vehicle blind areas in an application example of the second embodiment;

DETAILED DESCRIPTION

Figure 1:
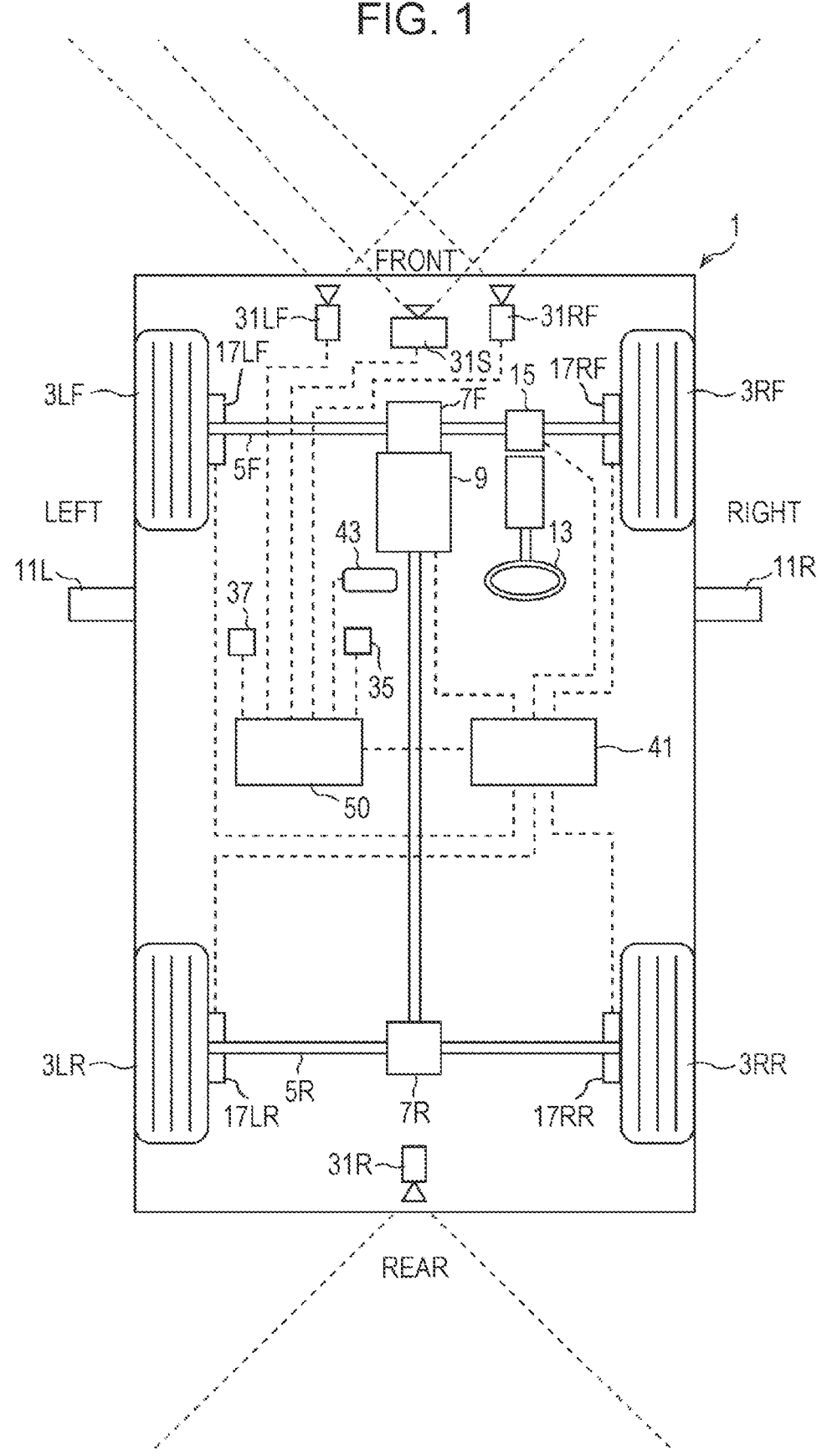
FIG. 1 schematically illustrates an example of the overall structure of a vehicle that includes a driving assistance apparatus according to any one of embodiments of the disclosure.

As for the vehicle control apparatus in JP-A No. 2016-122308, multiple blind areas are not considered. For this reason, the vehicle cannot be appropriately controlled in the case where there are the multiple blind areas, and there is a possibility that a risk of a collision with, for example, a vehicle cannot be reduced in the case where the vehicle, for example, is in any one of the blind areas.

It is desirable to provide a driving assistance apparatus that enables a host vehicle to move to a location at which the host vehicle is likely to be visually recognized by vehicles that may be in respective blind areas in the case of multiple blind areas and that enables a risk of an accident occurring to be reduced.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the present specification and the drawings, components that have substantially like functional configurations are designated by like reference characters, and a duplicated description is omitted.

1. Overall Structure of Vehicle

An example of the overall structure of a vehicle that can use driving assistance apparatuses according to embodiments of the disclosure will be described.

FIG. 1 schematically illustrates an example of the structure of a vehicle 1 that includes a driving assistance apparatus 50.

The vehicle 1 illustrated in FIG. 1 is a four-wheel drive automobile in which drive torque that is outputted from a drive power source 9 that generates the drive torque for the vehicle is transmitted to a left front wheel 3LF, a right front wheel 3RF, a left rear wheel 3LR, and a right rear wheel 3RR (referred to below as "wheels 3" when not distinguished from each other).

The drive power source 9 may be an internal combustion engine, such as a gasoline engine or a diesel engine, or a drive motor or may include an internal combustion engine and a drive motor.

Examples of the vehicle 1 may include an electric vehicle that includes two drive motors of a front wheel drive motor and a rear wheel drive motor and an electric vehicle that includes drive motors that are associated with the respective wheels 3. In the case where the vehicle 1 is an electric vehicle or a hybrid electric vehicle, the vehicle 1 includes a secondary battery that stores electric power to be supplied to a drive motor or a generator such as a motor or a fuel cell that generates electric power with which a battery is charged.

The vehicle 1 includes devices that are used for driving control for the vehicle 1 such as the drive power source 9, an electric steering device 15, and brake devices 17LF, 17RF, 17LR, and 17RR (referred to below as "brake devices 17" when not distinguished from each other). The drive power source 9 outputs drive torque that is transmitted to a front-wheel drive shaft 5F and a rear-wheel drive shaft 5R via a front-wheel differential mechanism 7F, a rear-wheel differential mechanism 7R, or a transmission not illustrated. A vehicle controller 41 that includes one or more electronic control units (ECU) controls the drive of the drive power source 9 and the transmission.

The electric steering device 15 is disposed on the front-wheel drive shaft 5F. The electric steering device 15 includes a gear mechanism and an electric motor not illustrated. The steering angles of the left front wheel 3LF and the right front wheel 3RF are adjusted under control of the vehicle controller 41. During manual driving, the vehicle controller 41 controls the electric steering device 15, based on the steering angle of a steering wheel 13 that is manipulated by a driver. During automatic driving, the vehicle controller 41 controls the electric steering device 15, based on a travel track that is set.

The brake devices 17LF, 17RF, 17LR, and 17RR apply braking force to the left front, right front, left rear, and right rear wheels 3LF, 3RF, 3LR, and 3RR, respectively. The brake devices are, for example, hydraulic brake devices and produce predetermined braking force in a manner in which the vehicle controller 41 controls hydraulic pressure that is applied to the brake devices 17. In the case where the vehicle 1 is an electric vehicle or a hybrid electric vehicle, the brake devices 17 are used together with regenerative braking with the drive motor.

The vehicle controller 41 includes one or more electronic control devices that control the brake devices 17 that are driven to control the braking force for the vehicle 1, the drive power source 9 that outputs the drive torque for the vehicle 1, and the electric steering device 15 that controls the steering angle of the steering wheel. The vehicle controller 41 may have a function of controlling the drive of the transmission that adapts the output from the drive power source 9 and that transmits the drive torque to the wheels 3. The vehicle controller 41 can obtain information that is transmitted from the driving assistance apparatus 50 and can implement automatic driving control for the vehicle 1.

The vehicle 1 includes front cameras 31LF and 31RF, a rear camera 31R, a light detection and ranging (LiDAR) sensor 31S, a vehicle state sensor 35, a global positioning system (GPS) sensor 37, and a human machine interface (HMI) 43.

The front cameras 31LF and 31RF, the rear camera 31R, and the LiDAR sensor 31S are included in a surrounding environment sensor that obtains information about the surrounding environment of the vehicle 1. The front cameras 31LF and 31RF and the rear camera 31R capture images of regions ahead of or behind the vehicle 1 and generate image data. The front cameras 31LF and 31RF and the rear camera 31R include imaging elements such as charged-coupled devices (CCDs) or complementary metal-oxide-semiconductor (CMOS) devices and transmit the generated image data to the driving assistance apparatus 50.

As for the vehicle 1 illustrated in FIG. 1, the front cameras 31LF and 31RF function as a stereo camera that includes a pair of left and right cameras, and the rear camera 31R functions as a so-called monocular camera. However, each of these may be a stereo camera or a monocular camera. For example, the vehicle 1 may include cameras that are disposed on side-view mirrors 11L and 11R and that capture images of left and right regions behind the vehicle 1 in addition to the front cameras 31LF and 31RF and the rear camera 31R.

The LiDAR sensor 31S emits an optical wave, receives the reflected wave of the optical wave, and detects an object and a distance to the object, based on a time until the reflected wave is received after the optical wave is emitted. The LiDAR sensor 31S transmits detection data to the driving assistance apparatus 50. Other than these, the vehicle 1 may include one or more surrounding environment sensors that obtain information about the surrounding environment such as a radar sensor, for example, a millimeter-wave radar sensor, and an ultrasonic sensor.

The vehicle state sensor 35 includes at least one sensor that detects the behavior and operational state of the vehicle 1. For example, the vehicle state sensor 35 includes at least one of a steering angle sensor, an accelerator pedal position sensor, a brake pedal stroke sensor, a brake pressure sensor, or an engine revolution sensor and detects the operational state of the vehicle 1 such as the steering angle of the steering wheel, an accelerator pedal position, the amount of braking, or engine revolutions. For example, the vehicle state sensor 35 includes at least one of a vehicle speed sensor, an acceleration sensor, or an angular speed sensor and detects the behavior of the vehicle such as a vehicle speed, forward and backward acceleration, lateral acceleration, and a yaw rate. The vehicle state sensor 35 transmits a sensor signal that includes the detected information to the driving assistance apparatus 50.

The GPS sensor 37 receives a satellite signal from a GPS satellite. The GPS sensor 37 transmits information about the position of the vehicle 1 in map data that is included in the received satellite signal to the driving assistance apparatus 50. An antenna that receives a satellite signal from another satellite system that identifies the position of the vehicle 1 may be included instead of the GPS sensor 37.

The HMI 43 is driven by the driving assistance apparatus 50 and provides various kinds of information to a driver by using a measure such as an image display or an audio output. For example, the HMI 43 includes a display device that is disposed in an instrument panel and a speaker that is included in the vehicle. The display device may be the display device of a navigation system. The HMI 43 may include a head-up display (HUD) that displays an image on a front windshield such that the image and a sight around the host vehicle 1 overlap.

2. First Embodiment

The driving assistance apparatus 50 according to the first embodiment will now be described.

2-1. Example of Structure of Driving Assistance Apparatus

Figure 2:
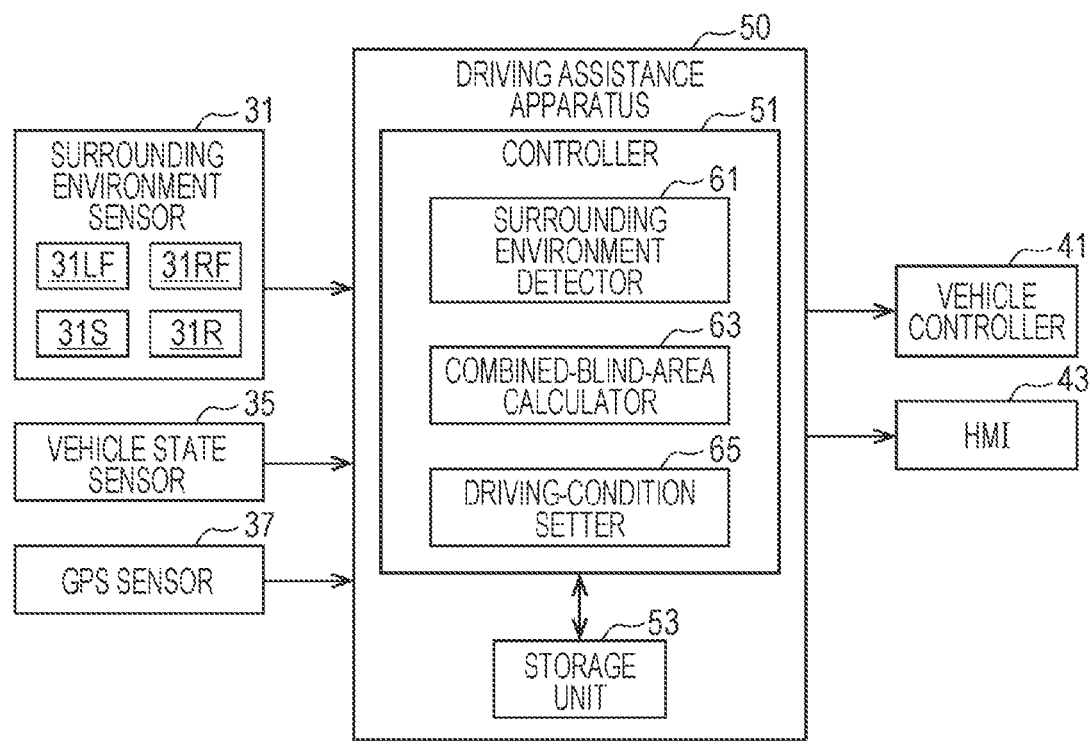
FIG. 2 is a block diagram illustrating an example of the structure of a driving assistance apparatus according to a first embodiment.

FIG. 2 is a block diagram illustrating an example of the structure of the driving assistance apparatus 50 according to the present embodiment.

A surrounding environment sensor 31, the vehicle state sensor 35, and the GPS sensor 37 are coupled to the driving assistance apparatus 50 directly or with a communication unit such as a controller area network (CAN) or a local interconnect network (LIN) interposed therebetween. The vehicle controller 41 and the HMI 43 are coupled to the driving assistance apparatus 50. The driving assistance apparatus 50 is not limited to an electronic control device that is included in the vehicle 1 but may be a terminal device such as a smartphone or a wearable device.

The driving assistance apparatus 50 includes a controller 51 and a storage unit 53. The controller 51 includes one or more processors such as CPUs. A part or the whole of the controller 51 may be, for example, firmware, which can be updated, or a program module that is run by an instruction from, for example, the CPUs. The storage unit 53 includes a storage element such as a random access memory (RAM) or a read only memory (ROM). The number and kind of the storage unit 53, however, are not particularly limited. The storage unit 53 stores a computer program that is run by the controller 51 and information such as various parameters that are used in an arithmetic operation, the detection data, and the result of the arithmetic operation.

2-2. Functional Configuration of Controller

The functional configuration of the controller 51 of the driving assistance apparatus 50 according to the present embodiment will now be described in detail. The controller 51 includes a surrounding environment detector 61, a combined-blind-area calculator 63, and a driving-condition setter 65. The functions of these components are performed by running a computer program by the one or more processors. A part or the whole of the surrounding environment detector 61, the combined-blind-area calculator 63, and the driving-condition setter 65 may be hardware.

Surrounding Environment Detector

The surrounding environment detector 61 detects the surrounding environment of the host vehicle 1, based on the detection data that is transmitted from the surrounding environment sensor 31. In one example, the surrounding environment detector 61 performs image processing on the image data that is transmitted from the front cameras 31LF and 31RF and the rear camera 31R and consequently detects, for example, a surrounding vehicle, a person, a bicycle, and another obstacle that are located around the host vehicle 1 by using a technique for detecting an object. The surrounding environment detector 61 detects, for example, an obstacle, based on the detection data that is transmitted from the LiDAR sensor 31S. The surrounding environment detector 61 calculates the positions of, for example, the surrounding vehicle and the person viewed from the vehicle 1, distances from the host vehicle 1 to, for example, the surrounding vehicle and the person, and relative speeds of, for example, the surrounding vehicle and the person with respect to the host vehicle 1.

Combined-Blind-Area Calculator

The combined-blind-area calculator 63 supposes that there are potential vehicles in respective host vehicle blind areas that are caused by multiple shrouds that are located around the host vehicle 1 and that are blind areas for the host vehicle 1 and calculates a combined blind area that is formed by at least two of potential vehicle blind areas that are caused by the shrouds and that are blind areas for the respective potential vehicles.

In one example, the combined-blind-area calculator 63 detects the shrouds, based on the result of detection performed by the surrounding environment detector 61. Representative examples of the shrouds include a stopped or parked vehicle and a building structure such as a side wall or a hedge. The shrouds, however, are not limited to these, provided that other moving bodies such as another vehicle, a pedestrian, and a bicycle are shielded from the host vehicle 1. The combined-blind-area calculator 63 may detect the shrouds by using information about the position of the host vehicle 1 in map data that is obtained by using the GPS sensor 37, information about a road ahead of the host vehicle 1 in a movement direction, and information that is obtained from an information-processing apparatus other than the host vehicle 1. The combined-blind-area calculator 63 sets the host vehicle blind areas that are caused by the detected shrouds for the host vehicle 1.

The combined-blind-area calculator 63 sets the potential vehicles in the respective host vehicle blind areas that are set and sets the potential vehicle blind areas for the potential vehicles. The potential vehicles are imaginary vehicles that are not detected by the surrounding environment detector 61 or that are not acknowledged as actual vehicles because the precision of detection is low. The potential vehicle blind areas are blind from the potential vehicles and are caused by the shrouds that cause the host vehicle blind areas in which the potential vehicles are set.

The combined-blind-area calculator 63 calculates the combined blind area that is formed by at least two of the potential vehicle blind areas that are set regarding the respective potential vehicles. The combined blind area corresponds to at least one of the at least two of the potential vehicle blind areas that are selected and means an overall blind area that is formed by superposing the at least two of the potential vehicle blind areas on a plane. The number of the potential vehicle blind areas for calculating the combined blind area may be two or may be three or more depending on the number of all of the potential vehicle blind areas, that is, the number of the potential vehicles. For example, in the case where the combined blind areas that are formed by two of the multiple potential vehicle blind areas are calculated, the combined-blind-area calculator 63 calculates the combined blind areas regarding all of combinations of the potential vehicle blind areas. Specific processing of the combined-blind-area calculator 63 will be described later in detail.

Driving-Condition Setter

The driving-condition setter 65 sets multiple paths for moving the host vehicle 1 to a location outside the one or more combined blind areas and sets the driving conditions of the host vehicle 1, based on any one of the multiple paths. The driving conditions include conditions about the target steering angle, target acceleration, and target deceleration of the host vehicle 1. According to the present embodiment, the driving-condition setter 65 sets the driving conditions of the host vehicle 1, based on a path of the multiple paths such that the time taken for moving the host vehicle 1 to the location outside the one or more combined blind areas is shortest.

The driving-condition setter 65 transmits information about the target steering angle, the target acceleration, and the target deceleration that are set to the vehicle controller 41. The vehicle controller 41 controls traveling of the host vehicle 1, based on the obtained information about the target steering angle, the target acceleration, and the target deceleration. At this time, the driving-condition setter 65 may set the target steering angle, the target acceleration, and the target deceleration such that the target steering angle does not exceed the predetermined upper limit of the steering angle, and the target acceleration and the target deceleration do not exceed the predetermined upper limits of the acceleration and the deceleration. This prevents sudden steering, sudden acceleration, or sudden deceleration of the host vehicle 1. Specific processing of the driving-condition setter 65 will be described later in detail.

2-3. Operation of Driving Assistance Apparatus

The operation of the driving assistance apparatus 50 according to the present embodiment will now be described as one example by using flowcharts.

FIG. 3 to FIG. 5 are flowcharts illustrating an example of the operation of the driving assistance apparatus 50.

A vehicle-mounted system that includes the driving assistance apparatus 50 starts up (a step S11), and then the surrounding environment detector 61 of the controller 51 obtains the detection data that is transmitted from the surrounding environment sensor 31 and detects the surrounding environment of the host vehicle 1, based on the detection data (a step S13). According to the present embodiment, the surrounding environment detector 61 detects, for example, another vehicle, a person, a building structure, a traffic sign, and a lane line that are around the host vehicle 1, based on the detection data that is transmitted from the front cameras 31LF and 31RF, the rear camera 31R, and the LiDAR sensor 31S.

Subsequently, the combined-blind-area calculator 63 of the controller 51 determines whether shrouds that can cause blind areas for the host vehicle 1 are around the host vehicle 1 (a step S15). For example, the combined-blind-area calculator 63 calculates the sizes and positions of objects that are detected by the surrounding environment detector 61 and relative speeds of the objects with respect to the host vehicle 1 and determines the presence of an object that can cause the blind area for the host vehicle 1. For example, as for a moving body that moves in a real space, in the case where the width, height, and depth of the object are equal to or more than predetermined dimensions, the object is within a predetermined distance from a track along which the host vehicle 1 is to travel, and the relative speed is equal to or less than a predetermined speed threshold, the combined-blind-area calculator 63 determines that the object corresponds to the shroud. As for a stationary object that does not move in the real space, in the case where the width, height, and depth of the object are equal to or more than predetermined dimensions, the object is within a predetermined distance from the track along which the host vehicle 1 is to travel, and the relative speed is equal to the vehicle speed of the host vehicle 1, the combined-blind-area calculator 63 determines that the object corresponds to the shroud.

If it is determined that there are no shrouds that cause the blind areas (No at S15), the processing returns to the step S13, and the combined-blind-area calculator 63 repeats a process of detecting the surrounding environment (the step S13) and a process of determining the presence of shrouds (the step S15). If it is determined that there are shrouds that can cause the blind areas (Yes at S15), the combined-blind-area calculator 63 performs a process of calculating the one or more combined blind areas (a step S17).

FIG. 4 is a flowchart illustrating the process of calculating the one or more combined blind areas.

The combined-blind-area calculator 63 first calculates the host vehicle blind areas that are caused by the shrouds (a step S41). For example, the combined-blind-area calculator 63 obtains information about the sizes, positions, and relative speeds of the objects that are determined to be the shrouds and calculates the host vehicle blind areas, based on the obtained information. In one example, the combined-blind-area calculator 63 sets the host vehicle blind areas to areas that are located behind the shrouds viewed from the host vehicle 1. For example, the host vehicle blind areas can be two-dimensional blind areas that overlook the surrounding environment including the shrouds. The combined-blind-area calculator 63 calculates the host vehicle blind areas regarding all of the shrouds that are detected around the host vehicle 1.

Subsequently, the combined-blind-area calculator 63 sets the potential vehicles in the respective host vehicle blind areas that are set (a step S43). The potential vehicles that are set are assumed to be within the host vehicle blind areas that are set and are set so as to be able to enter a range to which the host vehicle 1 can move. Multiple potential vehicles may be set in each host vehicle blind area. In some embodiments, for the host vehicle 1, however, the potential vehicles that are nearest to the host vehicle 1 in the respective host vehicle blind areas are set. The size of each potential vehicle is not particularly limited. As the size of each potential vehicle decreases, the area in which the potential vehicle can be set increases, and a potential risk in each host vehicle blind area can be set so as to increase.

At this time, depending on the sizes of the host vehicle blind areas that are calculated at the step S41, there can be a host vehicle blind area in which no potential vehicle is set.

Subsequently, the combined-blind-area calculator 63 calculates the potential vehicle blind areas for the respective potential vehicles that are set (a step S45). In one example, as for the potential vehicles, the combined-blind-area calculator 63 calculates areas that are blind from the potential vehicles due to the shrouds that cause the host vehicle blind areas in which the potential vehicles are set. The potential vehicle blind areas can be two-dimensional blind areas that overlook the surrounding environment including the shrouds as in the host vehicle blind areas. For example, the combined-blind-area calculator 63 sets the potential vehicle blind areas to areas that are located behind the shrouds viewed from appropriate positions on the potential vehicles that are set such as the center front thereof.

The combined-blind-area calculator 63 calculates the potential vehicle blind areas regarding all of the potential vehicles that are set.

Subsequently, the combined-blind-area calculator 63 calculates the one or more combined blind areas that are formed by at least two of the multiple potential vehicle blind areas that are calculated (a step S47). For example, the combined-blind-area calculator 63 calculates the combined blind areas that are formed by two of the potential vehicle blind areas regarding all of combinations of the potential vehicle blind areas. The number of the potential vehicle blind areas for calculating the one or more combined blind areas may be three or more or may change depending on the number of the potential vehicles or the potential vehicle blind areas.

Referring to FIG. 3 again, after the one or more combined blind areas are calculated at the step S17, the driving-condition setter 65 of the controller 51 performs a process of setting the driving conditions of the host vehicle 1 (a step S19).

FIG. 5 is a flowchart illustrating the process of setting the driving conditions for moving the host vehicle 1 to a location outside the one or more combined blind areas in the shortest time.

Regarding each combined blind area that is calculated at the step S17, the driving-condition setter 65 first calculates a path and the time taken for moving the host vehicle 1 to the location outside the combined blind area (a step S51). In one example, regarding each combined blind area, the driving-condition setter 65 sets one or more target positions and paths for moving the host vehicle 1 to the location outside the combined blind area and calculates the time taken for movement along the paths. For example, the one or more target positions to which the host vehicle 1 is to move may be positions to which linear distances from the current position of the host vehicle 1 are shortest or may be positions to which linear distances from the current position of the host vehicle 1 are shortest in an area in which distances from another vehicle and another obstacle are equal to or more than a predetermined distance. The number of the paths that are set for each combined blind area is not particularly limited.

The driving-condition setter 65 calculates the time taken for moving the host vehicle 1 to the one or more target positions along the paths, based on information about the current vehicle speed, steering angle, acceleration, and deceleration of the host vehicle 1. At this time, the driving-condition setter 65 may calculate the time taken for moving the host vehicle 1 to the one or more target positions along the paths by additionally using information about the predetermined upper limit of a change in the steering angle or acceleration and deceleration such that sudden steering, sudden acceleration, or sudden deceleration does not occur.

Subsequently, the driving-condition setter 65 selects a path from the paths that are set regarding one or more combined blind areas for moving the host vehicle 1 to the location outside the combined blind areas such that the taken time is shortest (a step S53). Subsequently, the driving-condition setter 65 sets the target steering angle, the target acceleration, and the target deceleration such that the host vehicle 1 travels along the selected path (a step S55). The driving-condition setter 65 transmits information about the target steering angle, the target acceleration, and the target deceleration that are set to the vehicle controller 41. The vehicle controller 41 controls traveling of the host vehicle 1, based on the obtained information about the target steering angle, the target acceleration, and the target deceleration.

Referring to FIG. 3 again, after the driving-condition setter 65 sets the driving conditions at the step S19, the driving-condition setter 65 determines whether the vehicle-mounted system that includes the driving assistance apparatus 50 stops (a step S21). If the vehicle-mounted system does not stop (No at S21), the processing returns to the step S13, and the driving assistance apparatus 50 repeats the processes at the steps described above. If the vehicle-mounted system stops (Yes at S21), the driving assistance apparatus 50 stops operating.

The driving assistance apparatus 50 according to the present embodiment thus sets the path for moving the host vehicle 1 to the location outside the one or more combined blind areas in the shortest time and sets the driving conditions for moving the host vehicle 1 along the path. The driving assistance apparatus 50 sets the path and the driving conditions per cycle of the arithmetic operation of the controller 51, sequentially performs the process of transmitting information about the driving conditions that are set to the vehicle controller 41, and finally causes the host vehicle 1 to move to a location outside the potential vehicle blind areas. The path is not set such that the host vehicle 1 moves to a location outside all of the potential vehicle blind areas but is set such that the host vehicle 1 moves to the location outside the one or more combined blind areas. This enables the host vehicle 1 to move to a location at which at least two potential vehicles can visually recognize the host vehicle 1. Since the path is selected such that the host vehicle 1 moves to a location outside any one of the one or more combined blind areas in the shortest time, the host vehicle 1 can quickly move to the location at which at least two potential vehicles can visually recognize the host vehicle 1. Accordingly, a risk of accidents occurring between the host vehicle 1 and the potential vehicles or a near miss can be quickly reduced.

2-4. Application Example

The driving assistance apparatus 50 according to the present embodiment is described above. An example of a travel scene in which the driving assistance apparatus 50 according to the present embodiment is used will now be described.

FIG. 6 to FIG. 9 are diagrams for description of an application example of the driving assistance apparatus 50 according to the present embodiment and illustrate a travel scene in which the host vehicle 1 that travels on a three-lane road passes through an intersection.

Figure 6:
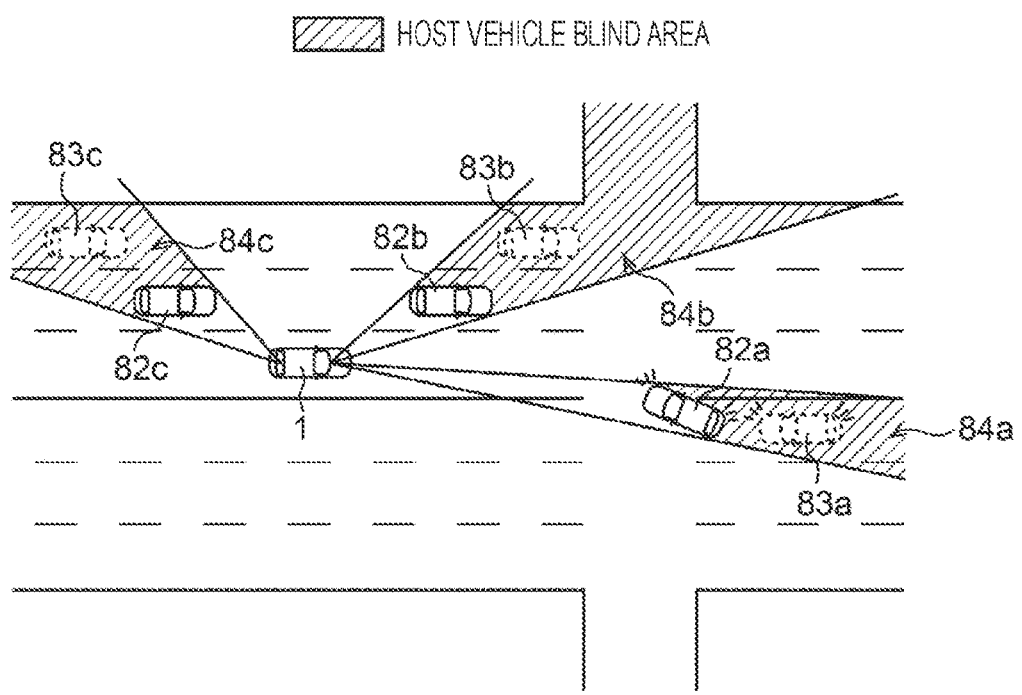
FIG. 6 illustrates host vehicle blind areas in an application example of the first embodiment.

As illustrated in FIG. 6, the host vehicle 1 travels along a right-hand lane of the three-lane road. At the intersection ahead of the host vehicle 1, another vehicle 82a waits for turning right on an oncoming lane. Another vehicle 82b on the left ahead of the host vehicle 1 travels along a center lane of the three-lane road. Another vehicle 82c on the left behind the host vehicle 1 travels along the center lane of the three-lane road.

In the travel scene, the combined-blind-area calculator 63 of the controller 51 detects, as the shrouds that cause the blind areas for the host vehicle 1, the vehicles 82a, 82b, and 82c in the surrounding environment that is detected by the surrounding environment detector 61. The combined-blind-area calculator 63 sets host vehicle blind areas 84a, 84b, and 84c that are caused by the vehicles 82a, 82b, and 82c that are detected as the shrouds. The combined-blind-area calculator 63 sets potential vehicles 83a, 83b, and 83c in the respective host vehicle blind areas 84a, 84b, and 84c. In FIG. 6, the potential vehicles 83a, 83b, and 83c are set in the respective host vehicle blind areas 84a, 84b, and 84c.

Figure 7:
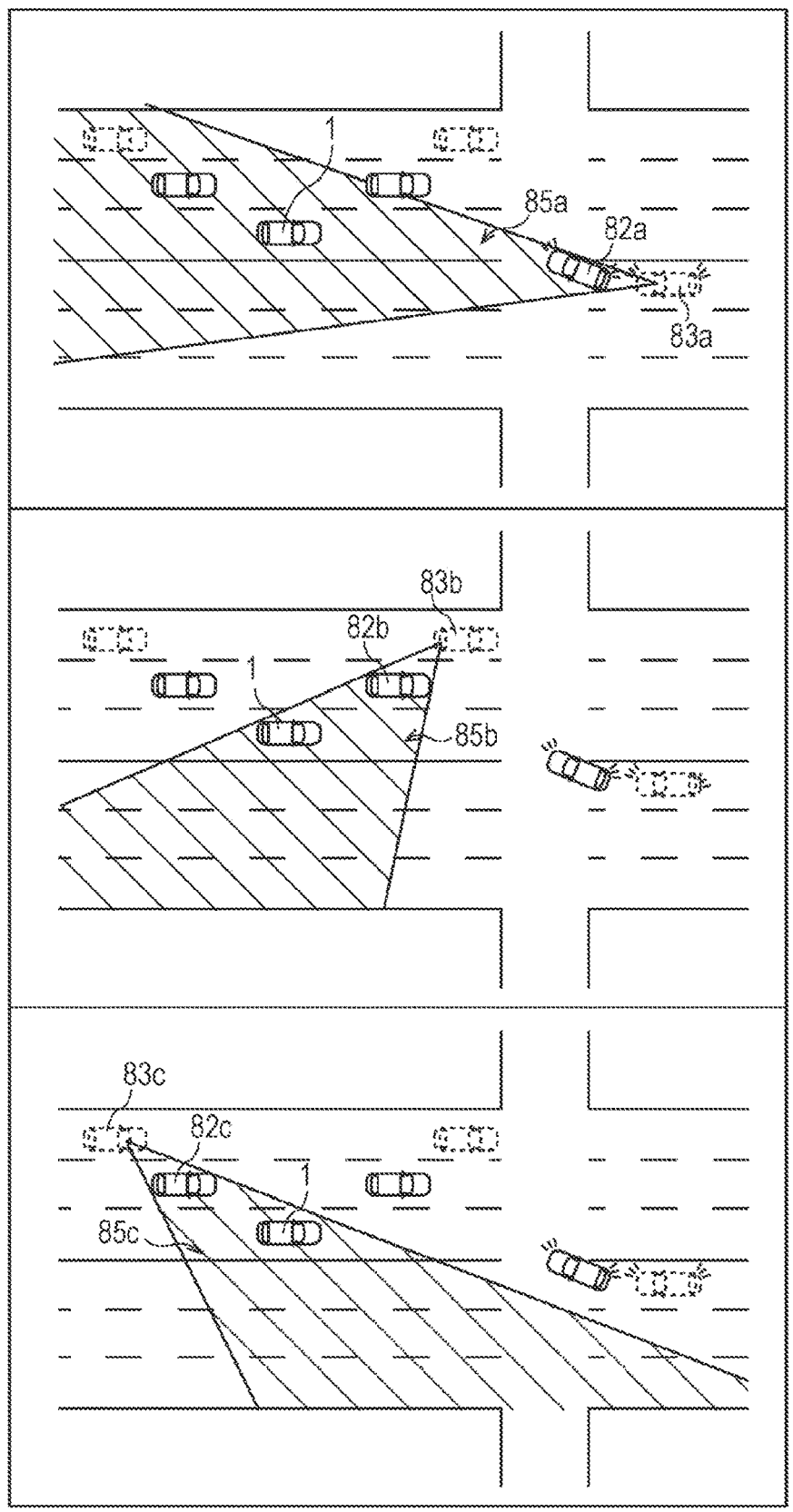
FIG. 7 illustrates potential vehicle blind areas in the application example of the first embodiment.

Subsequently, as illustrated in FIG. 7, the combined-blind-area calculator 63 sets potential vehicle blind areas 85a, 85b, and 85c for the potential vehicles 83a, 83b, and 83c that are set.

In one example, as illustrated in an upper part in FIG. 7, the host vehicle blind area 84a in which the potential vehicle 83a is set is caused by the vehicle 82a, and the potential vehicle blind area 85a viewed from the potential vehicle 83a is set as the blind area for the potential vehicle 83a that is caused by the vehicle 82a. Similarly, as illustrated in a middle part in FIG. 7, the host vehicle blind area 84b in which the potential vehicle 83b is set is caused by the vehicle 82b, and the potential vehicle blind area 85b viewed from the potential vehicle 83b is set as the blind area for the potential vehicle 83b that is caused by the vehicle 82b.

As illustrated in a lower part in FIG. 7, the host vehicle blind area 84c in which the potential vehicle 83c is set is caused by the vehicle 82c, and the potential vehicle blind area 85c viewed from the potential vehicle 83c is set as the blind area for the potential vehicle 83c that is caused by the vehicle 82c.

Figure 8:
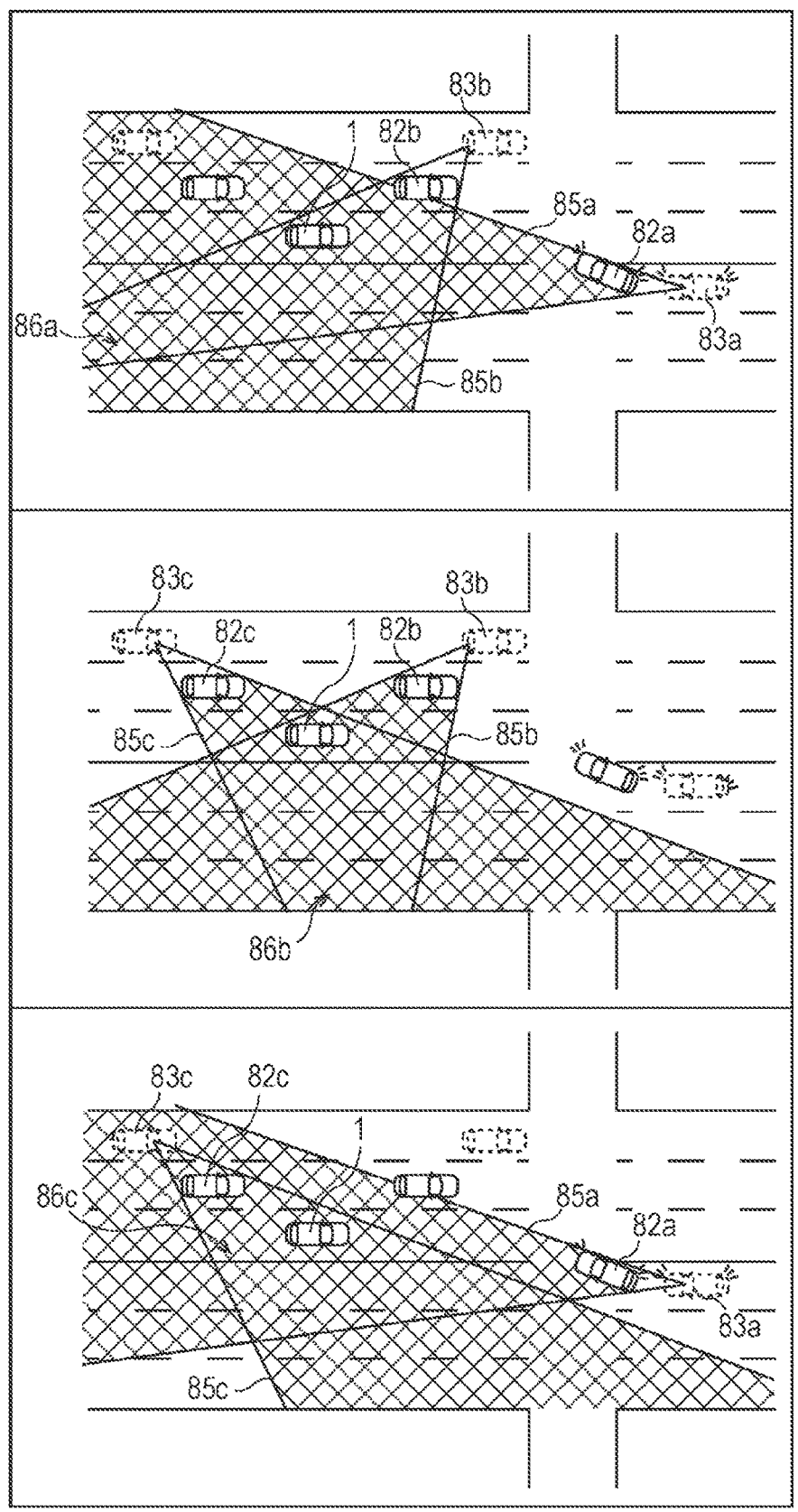
FIG. 8 illustrates combined blind areas in the application example of the first embodiment.

Subsequently, as illustrated in FIG. 8, the driving-condition setter 65 of the controller 51 calculates combined blind areas 86a, 86b, and 86c that are formed by the potential vehicle blind areas 85a, 85b, and 85c. In an example illustrated in FIG. 8, the combined blind areas 86a, 86b, and 86c that are formed by two of the three potential vehicle blind areas 85a, 85b, and 85c are calculated.

In one example, as illustrated in an upper part in FIG. 8, an area that is formed by the potential vehicle blind area 85a for the potential vehicle 83a and the potential vehicle blind area 85b for the potential vehicle 83b is calculated as the combined blind area 86a. As illustrated in a middle part in FIG. 8, an area that is formed by the potential vehicle blind area 85b for the potential vehicle 83b and the potential vehicle blind area 85c for the potential vehicle 83c is calculated as the combined blind area 86b. As illustrated in a lower part in FIG. 8, an area that is formed by the potential vehicle blind area 85a for the potential vehicle 83a and the potential vehicle blind area 85c for the potential vehicle 83c is calculated as the combined blind area 86c.

Figure 9:
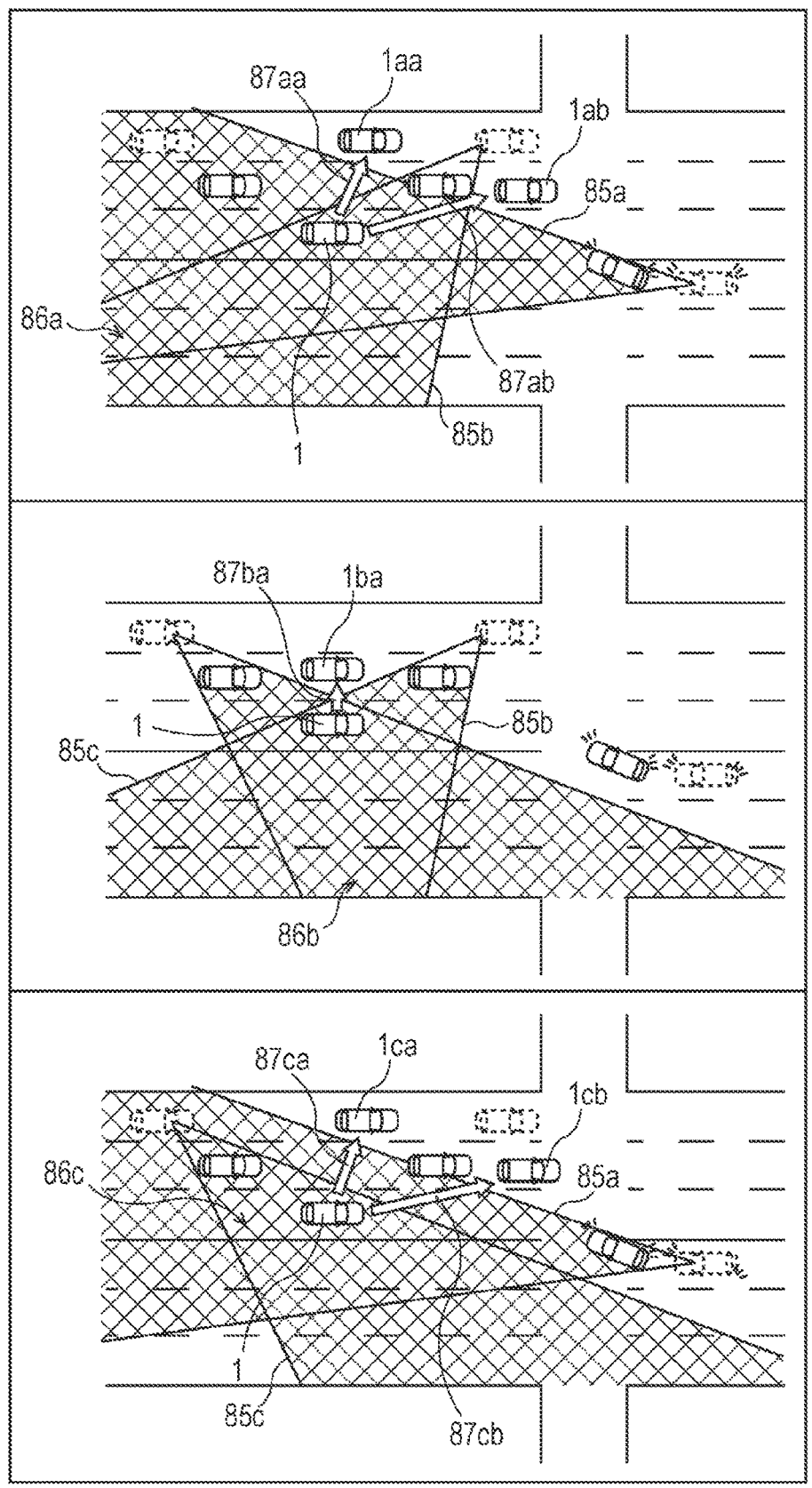
FIG. 9 illustrates a method of selecting a path in the application example of the first embodiment.

Subsequently, as illustrated in FIG. 9, the driving-condition setter 65 sets multiple target positions 1aa, 1ab, 1ba, 1ca, and 1cb or one of these and paths 87aa, 87ab, 87ba, 87ca, and 87cb or one of these for moving the host vehicle 1 to a location outside the combined blind areas 86a, 86b, and 86c regarding the combined blind areas 86a, 86b, and 86c. In an example illustrated in FIG. 9, the multiple target positions 1aa, 1ab, 1ba, 1ca, and 1cb or one of these is set in an area a predetermined distance or more away from the vehicles 82b and 82c that travel around the host vehicle 1.

In one example, as illustrated in an upper part in FIG. 9, the two target positions 1aa and 1ab are set regarding the combined blind area 86a. As illustrated in a middle part in FIG. 9, the single target position 1ba is set regarding the combined blind area 86b. As illustrated in a lower part in FIG. 9, the two target positions 1ca and 1cb are set regarding the combined blind area 86c.

The driving-condition setter 65 calculates the time taken for moving the host vehicle 1 to the target positions 1aa, 1ab, 1ba, 1ca, and 1cb along the respective paths 87aa, 87ab, 87ba, 87ca, and 87cb, based on the information about the current vehicle speed, steering angle, acceleration, and deceleration of the host vehicle 1 and the settable upper limit of the change in the steering angle or acceleration and deceleration such that sudden steering, sudden acceleration, or sudden deceleration does not occur. In FIG. 9, the paths 87aa, 87ab, 87ba, 87ca, and 87cb are illustrated by straight lines. However, the paths that are set are not limited to straight lines.

The driving-condition setter 65 selects a path from the multiple paths 87aa, 87ab, 87ba, 87ca, and 87cb that are set such that the taken time is shortest. In an example illustrated in FIG. 9, the path 87ba, for example, is selected. The driving-condition setter 65 sets the target steering angle, the target acceleration, and the target deceleration for moving the host vehicle 1 along the path 87ba that is selected and transmits the information about the target steering angle, the target acceleration, and the target deceleration to the vehicle controller 41.

Figure 10:
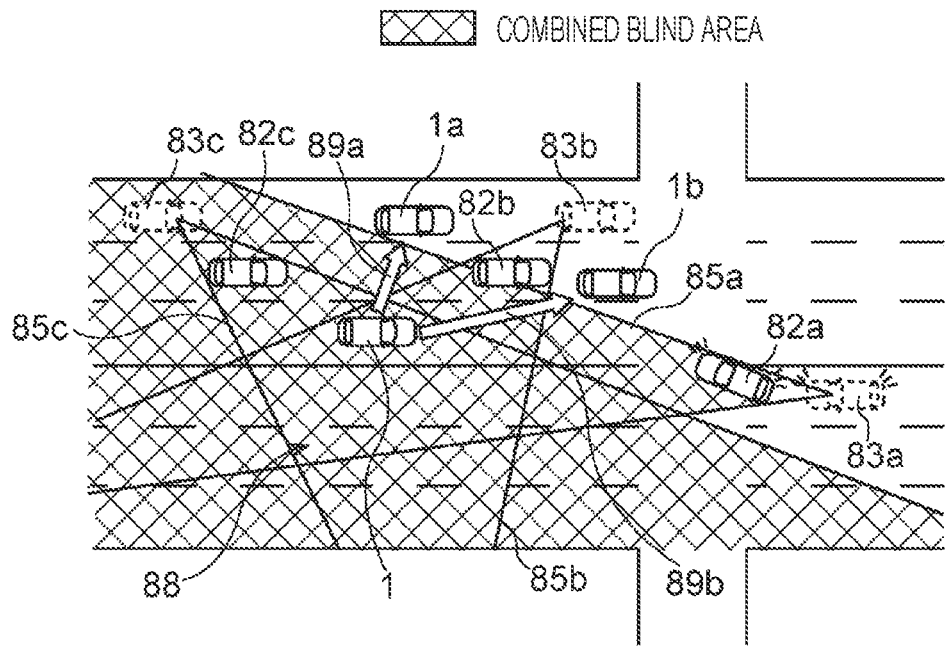
FIG. 10 illustrates another combined blind area in the application example of the first embodiment.

In an example illustrated in FIG. 10, a combined blind area 88 that is formed by the three potential vehicle blind areas 85a, 85b, and 85c is calculated. In this case, the driving-condition setter 65 calculates the combined blind area 88 that is formed by the potential vehicle blind areas 85a, 85b, and 85c and sets multiple target positions 1a and 1b or one of these and multiple paths 89a and 89b or one of these for moving the host vehicle 1 to a location outside the combined blind area 88. In the example in FIG. 10, the two target position 1a and 1b are set regarding the combined blind area 88. The driving-condition setter 65 calculates the time taken for moving the host vehicle 1 to the target positions 1a and 1b along the respective paths 89a and 89b, based on the information about the current vehicle speed, steering angle, acceleration, and deceleration of the host vehicle 1 and the settable upper limit of the change in the steering angle or the acceleration and deceleration such that sudden steering, sudden acceleration, or sudden deceleration does not occur. The paths that are set are not limited to straight lines.

The driving-condition setter 65 selects a path from the multiple paths 89a and 89b that are set such that the taken time is shortest. In an example illustrated in FIG. 10, the path 89a, for example, is selected. The driving-condition setter 65 sets the target steering angle, the target acceleration, and the target deceleration for moving the host vehicle 1 along the path 89a that is selected and transmits the information about the target steering angle, the target acceleration, and the target deceleration to the vehicle controller 41.

The driving assistance apparatus 50 thus sets the target steering angle, the target acceleration, and the target deceleration per cycle of the arithmetic operation and assists in driving the host vehicle 1. This enables the host vehicle 1 to quickly move such that the host vehicle 1 is recognized by at least two or more potential vehicles of the potential vehicles 83a, 83b, and 83c that can be in the respective host vehicle blind areas 84a, 84b, and 84c in the case where the number of the host vehicle blind areas 84a, 84b, and 84c for the host vehicle 1 is two or more. The driving assistance apparatus 50 sequentially performs a process of setting the target steering angle, the target acceleration, and the target deceleration per cycle of the arithmetic operation and finally causes the host vehicle 1 to move to a location outside the potential vehicle blind areas 85a, 85b, and 85c. Accordingly, a risk of collisions occurring between the host vehicle 1 and the potential vehicles 83a, 83b, and 83c that can be in the respective host vehicle blind areas 84a, 84b, and 84c or the near miss can be reduced.

3. Second Embodiment

A driving assistance apparatus according to a second embodiment will now be described.

The driving assistance apparatus according to the second embodiment sets the driving conditions of the host vehicle 1, based on a path for moving the host vehicle 1 to a location outside the combined blind area that has the maximum degree of seriousness of a collision accident supposing that the accident occurs between the host vehicle 1 and a potential vehicle. Differences between the driving assistance apparatus according to the second embodiment and the driving assistance apparatus according to the first embodiment will be mainly describe below.

3-1. Example of Structure of Driving Assistance Apparatus

Figure 11:
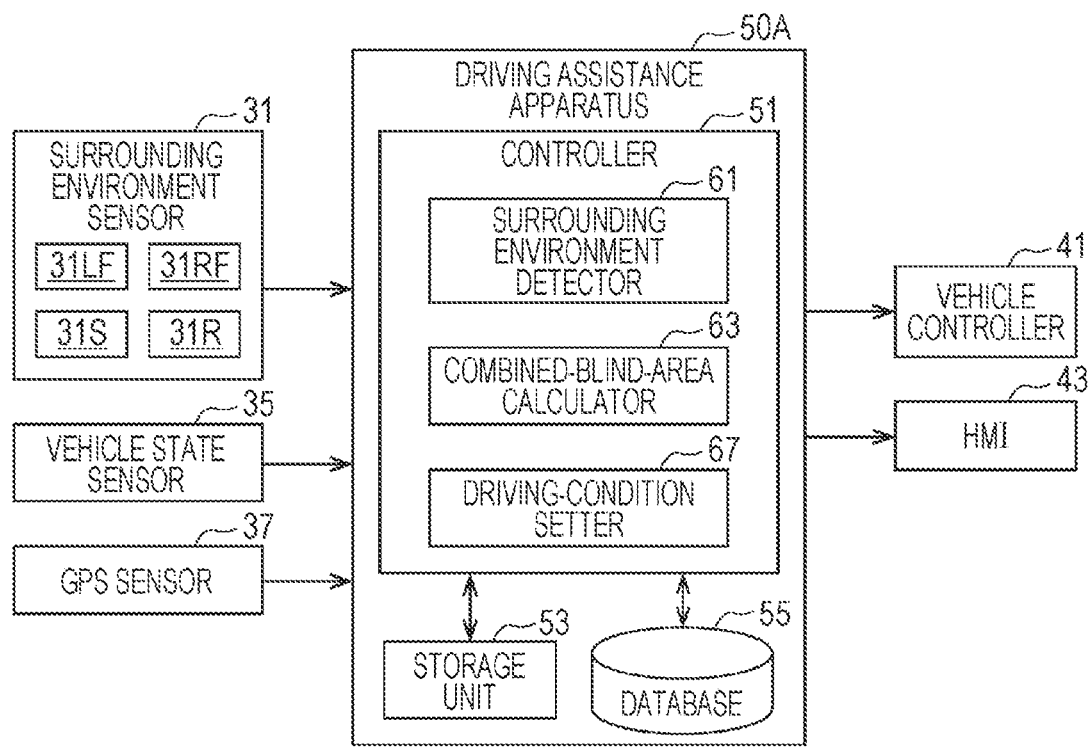
FIG. 11 is a block diagram illustrating an example of the structure of a driving assistance apparatus according to a second embodiment.

FIG. 11 is a block diagram illustrating an example of the structure of a driving assistance apparatus 50A according to the present embodiment.

The driving assistance apparatus 50A includes the controller 51, the storage unit 53, and a database 55 of the level of seriousness of an accident (hereinafter also referred to as a database 55). The database 55 is created by using a storage element such as a RAM or a ROM or a storage medium such as a HDD, a CD, a DVD, a SSD, a USB flash, or a storage device. For example, the database 55 stores the data of the level of seriousness that represents the degree of human damage and property damage in accidents that occurred in the past and that is associated with traffic conditions and the kind of vehicles when the accidents occurred. The level of seriousness is classified into multiple level scales (for example, five scales).

As for the database 55, for example, a similar phenomenon may be found from a database that stores the data of accidents that occurred by using variables of a collied part of the host vehicle, a collision speed, a collision angle, the weight of a colliding object, the position at which an occupant of the host vehicle sits, and whether the occupant wears a seat belt when an accident occurs, and the level of seriousness may be calculated based on the result of damage of the host vehicle or the occupant of the host vehicle in the similar phenomenon. For example, the database 55 may store the data of the level of seriousness that is evaluated based on the data of accident images that are collected by drive recorders that are included in multiple vehicles or may be created by, for example, an insurance institution. The database 55 may not be contained in the driving assistance apparatus 50A, and the driving assistance apparatus 50A may be capable of accessing the database 55 by using a wireless communication unit such as a mobile communication unit.

The controller 51 and the storage unit 53 can be the same as those of the driving assistance apparatus 50 according to the first embodiment, and the description thereof is omitted here.

3-2. Functional Configuration of Controller

The controller 51 of the driving assistance apparatus 50A according to the present embodiment includes the surrounding environment detector 61, the combined-blind-area calculator 63, and a driving-condition setter 67 as in the driving assistance apparatus 50 according to the first embodiment. Among these, the surrounding environment detector 61 and the combined-blind-area calculator 63 perform the same arithmetic operations as those of the surrounding environment detector 61 and the combined-blind-area calculator 63 of the driving assistance apparatus 50 according to the first embodiment.

As for the driving assistance apparatus 50A according to the present embodiment, the driving-condition setter 67 refers to the database 55 and obtains the level of seriousness of accidents between the host vehicle 1 and the potential vehicles that is assumed based on possible driving behavior of the host vehicle 1 and possible driving behavior of the potential vehicles. The driving-condition setter 67 sets multiple paths for moving the host vehicle 1 to a location outside the one or more combined blind areas and selects a path, based on the obtained level of seriousness. According to the present embodiment, regarding every combined blind area, the driving-condition setter 67 calculates the degree of seriousness of the combined blind area corresponding to the maximum level of seriousness of levels of the assumed accidents between the host vehicle 1 and the potential vehicles that are set in the potential vehicle blind areas forming the combined blind area and selects a path for moving the host vehicle 1 to a location outside the combined blind area that has the maximum degree of seriousness. Specific processing of the driving-condition setter 67 will be described later in detail.

3-3. Operation of Driving Assistance Apparatus

The operation of the driving assistance apparatus 50A according to the present embodiment will now be described as one example by using flowcharts.

The controller 51 of the driving assistance apparatus 50A according to the present embodiment performs the arithmetic operation basically as illustrated in the flowchart in FIG. 3. At steps other than the step S19 at which the process of setting the driving conditions is performed, the same processing as that of the controller 51 of the driving assistance apparatus 50 according to the first embodiment is performed.

FIG. 12 is a flowchart illustrating the process of setting the driving conditions that is performed at the step S19 for moving the host vehicle 1 to the location outside the combined blind area that has the maximum degree of seriousness of the assumed accidents.

Regarding each combined blind area that is calculated at the step S17, the driving-condition setter 67 first calculates a path along which the host vehicle 1 can move to the location outside the combined blind area (a step S61). In one example, regarding each combined blind area, the driving-condition setter 67 sets one or more target positions and paths for moving the host vehicle 1 to the location outside the combined blind area. For example, the one or more target positions to which the host vehicle 1 is to move may be positions to which linear distances from the current position of the host vehicle 1 are shortest or may be positions to which linear distances from the current position of the host vehicle 1 are shortest in an area in which distances from another vehicle and another obstacle are equal to or more than a predetermined distance. The number of the paths that are set for each combined blind area is not particularly limited.

Subsequently, the driving-condition setter 67 calculates the degree of seriousness of each combined blind area (a step S63). For example, the driving-condition setter 67 sets possible driving behavior of the host vehicle 1 and the potential vehicles. The driving behavior of the host vehicle 1 can be set based on information about, for example, the current vehicle speed, deceleration, acceleration, steering angle, travel position, and direction of the host vehicle 1, the position of a surrounding object, the distance to the surrounding object, and the relative speed. The driving behavior of the host vehicle 1 that is set is not limited to single behavior, but multiple driving behaviors may be set. Possible driving behavior of the potential vehicles can be set based on information about, for example, the sizes of the host vehicle blind areas in which the potential vehicles are set, the positions of the potential vehicles, and the positions of objects around the potential vehicles.

In the case where the host vehicle 1 moves along the paths that are set, the driving-condition setter 67 verifies, based on possible driving behavior of the host vehicle 1 and the potential vehicles, whether the phenomena that are registered in the database 55 can occur in descending order of the level of seriousness and extracts the phenomenon that has the maximum level of seriousness regarding each combined blind area. Regarding each combined blind area, the driving-condition setter 67 calculates the level of seriousness of the extracted phenomenon that has the maximum level of seriousness as the degree of seriousness of the combined blind area.

Subsequently, the driving-condition setter 67 selects a path from the multiple paths that are set at the step S61 for moving the host vehicle 1 to the location outside the combined blind area that has the maximum degree of seriousness that is calculated (a step S65). In the case where multiple paths are set for moving the host vehicle 1 to the location outside the combined blind area that has the maximum degree of seriousness, the driving-condition setter 67 may perform the process of calculating the taken time, which is performed by the driving assistance apparatus 50 according to the first embodiment, and may select a path from the multiple paths such that the taken time is shortest.

Subsequently, the driving-condition setter 67 sets the steering angle, the acceleration, and the deceleration for moving the host vehicle 1 along the selected path (a step S67). The driving-condition setter 67 transmits information about the steering angle, acceleration, and deceleration that are set to the vehicle controller 41. The vehicle controller 41 controls the traveling of the host vehicle 1, based on the obtained information about the target steering angle, the target acceleration, and the target deceleration.

The driving assistance apparatus 50A according to the present embodiment thus sets the multiple paths for moving the host vehicle 1 to the location outside the one or more combined blind areas, refers to the database 55, and obtains the level of seriousness of accidents between the host vehicle 1 and the potential vehicles that is assumed regarding the one or more combined blind areas. The driving assistance apparatus 50A preferentially selects the path for moving the host vehicle 1 to the location outside the combined blind area that has the maximum degree of seriousness that is the sum of the level of seriousness of the assumed accidents and sets the driving conditions for moving the host vehicle 1 along the path. The driving assistance apparatus 50A sets the path and the driving conditions per cycle of the arithmetic operation of the controller 51, sequentially performs the process of transmitting the information about the driving conditions that are set to the vehicle controller 41, and finally causes the host vehicle 1 to move to the location outside the potential vehicle blind areas. The path is selected for movement to the location outside the combined blind area that has the maximum degree of seriousness of the assumed accidents. For this reason, even when an accident occurs, damage due to the accident can be reduced.

3-4. Application Example

The driving assistance apparatus 50A according to the present embodiment is described above. An example of a travel scene in which the driving assistance apparatus 50A according to the present embodiment is used will now be described.

Figure 14:
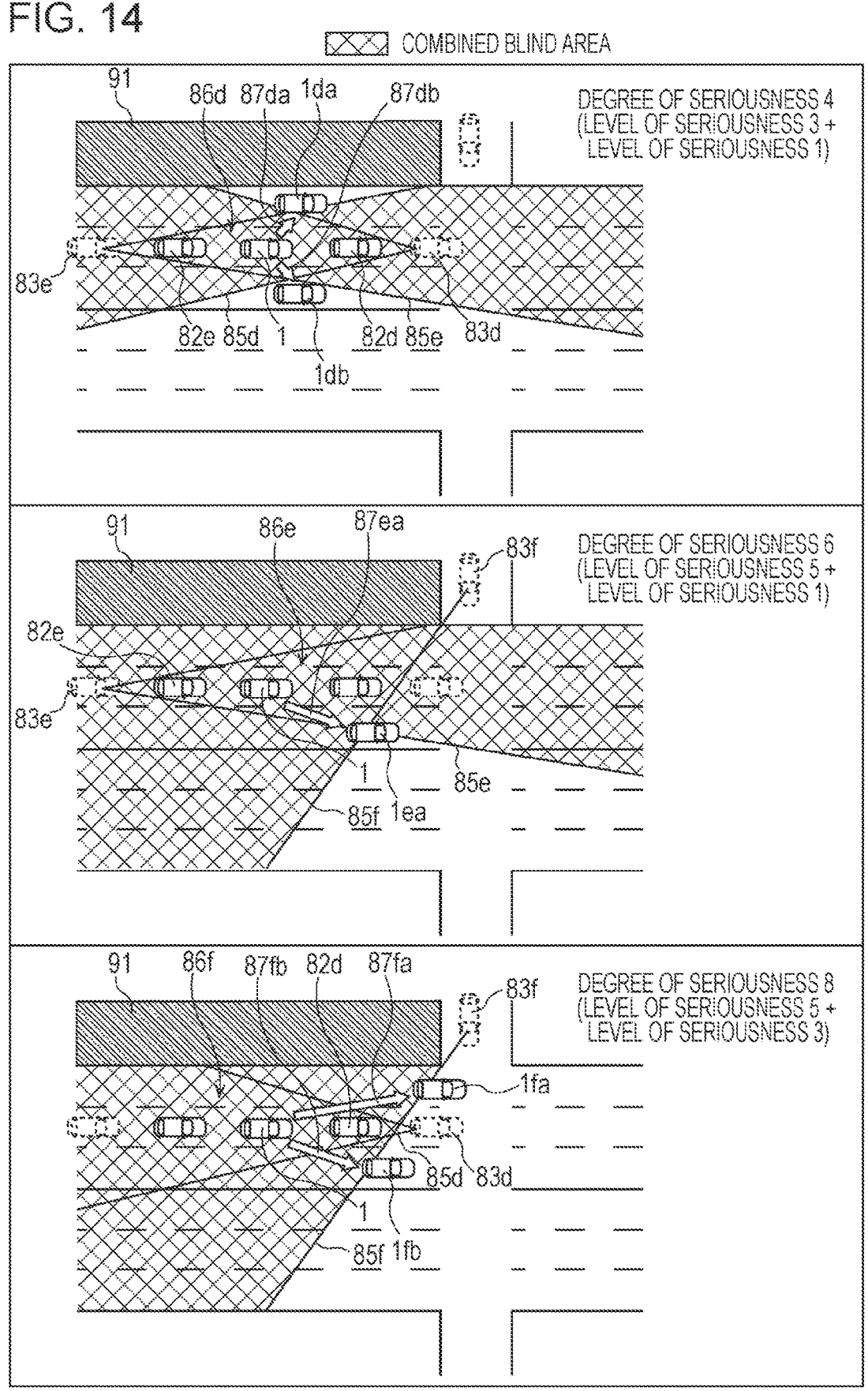
FIG. 14 illustrates the method of selecting the path in the application example of the second embodiment.

FIG. 13 and FIG. 14 are diagrams for description of an application example of the driving assistance apparatus 50A according to the present embodiment and illustrate a travel scene in which the host vehicle 1 that travels on a three-lane road passes through an intersection at which visibility is poor.

As illustrated in FIG. 13, the host vehicle 1 travels along a center lane of the three-lane road. Another vehicle 82*d* travels along the same center lane ahead of the host vehicle 1. Another vehicle 82*e* travels along the same center lane behind the host vehicle 1. A building structure 91 such as a side wall extends to the intersection ahead of the host vehicle 1 along the right side of the road.

In the case of the travel scene, the combined-blind-area calculator 63 of host vehicle 1 detects, as the shrouds that cause the blind areas for the host vehicle 1, the vehicles 82*d* and 82*e* and the building structure 91 in the surrounding environment that is detected by the surrounding environment detector 61. The combined-blind-area calculator 63 sets host vehicle blind areas 84*d*, 84*e*, and 84*f* that are caused by the vehicles 82*d* and 82*e* and the building structure 91 that are detected as the shrouds. The combined-blind-area calculator 63 sets potential vehicles 83*d*, 83*e*, and 83*f* in the respective host vehicle blind areas 84*d*, 84*e*, and 84*f*. In FIG. 13, the potential vehicles 83*d*, 83*e*, and 83*f* are set in the respective host vehicle blind areas 84*d*, 84*e*, and 84*f*.

FIG. 14 illustrates multiple paths 87*da*, 87*db*, 87*ea*, 87*fa*, and 87*fb* for moving the host vehicle 1 to a location outside combined blind areas 86*d*, 86*e*, and 86*f* that are set through the procedures described according to the first embodiment. In the case where the path is selected such that the taken time is shortest as described according to the first embodiment, the path 87*da* or the path 87*db*, for example, is selected. According to the present embodiment, the degree of seriousness of the combined blind areas 86*d*, 86*e*, and 86*f* is calculated, and the path for moving the host vehicle 1 to the location outside the combined blind area that has the maximum degree of seriousness is selected.

Figure 15:
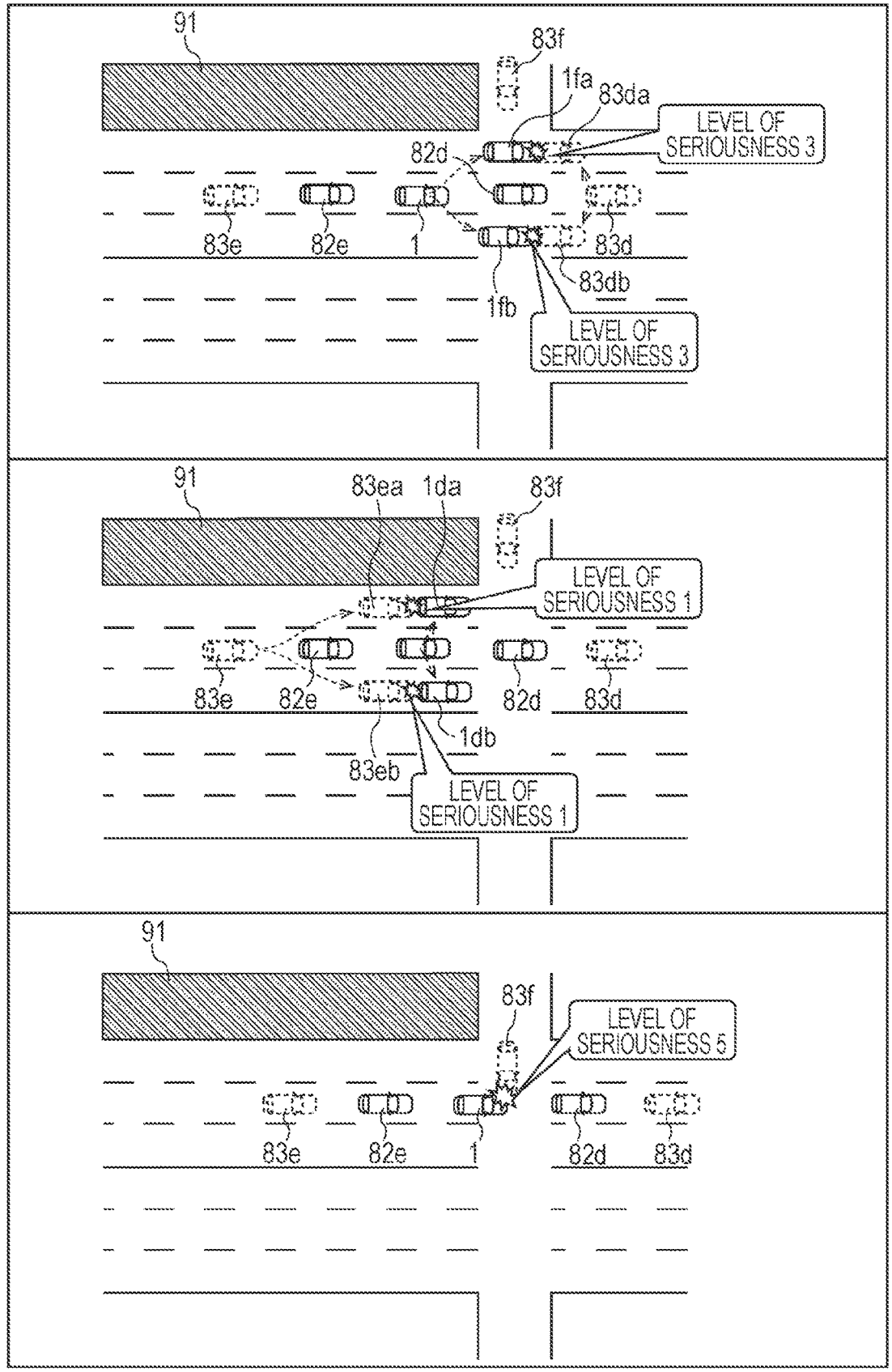
FIG. 15 illustrates the level of seriousness of accidents in the application example of the second embodiment.

FIG. 15 illustrates the level of seriousness of accidents between the host vehicle 1 and the potential vehicles 83*d*, 83*e*, and 83*f* that is assumed based on possible driving behavior of the host vehicle 1 and possible driving behavior of the potential vehicles 83d, 83e, and 83f.

FIG. 15 at an upper part illustrates an assumed accident between the host vehicle 1 and the potential vehicle 83d that is set in the host vehicle blind area 84d that is caused by the vehicle 82d that travels ahead of the host vehicle 1. For example, the host vehicle 1 changes the lane into the right-hand lane or the left-hand lane while accelerating to overtake the vehicle 82d. At this time, if the potential vehicle 83d changes the lane into the right-hand lane or left-hand lane same as the host vehicle 1 while decelerating, the host vehicle 1 collides with the potential vehicle 83d. In the database 55, the stored data of the level of seriousness of an accident that occurred in the past in a similar travel scene is, for example, "Level of Seriousness=3".

FIG. 15 at a middle part illustrates an assumed accident between the host vehicle 1 and the potential vehicle 83e that is set in the host vehicle blind area 84e that is caused by the vehicle 82e that travels behind the host vehicle 1. For example, the host vehicle 1 changes the lane into the right-hand lane or the left-hand lane while maintaining the vehicle speed. At this time, if the potential vehicle 83e changes the lane into the right-hand lane or left-hand lane same as the host vehicle 1 while accelerating to overtake the vehicle 82e, the potential vehicle 83e collides with the host vehicle 1. In the database 55, the stored data of the level of seriousness of an accident that occurred in the past in a similar travel scene is, for example, "Level of Seriousness=1".

FIG. 15 at a lower part illustrates an assumed accident between the host vehicle 1 and the potential vehicle 83f that is set in the host vehicle blind area 84f that is caused by the building structure 91. The host vehicle 1 does not recognize the potential vehicle 83f and keeps travelling. At this time, if the potential vehicle 83f enters the intersection at a certain vehicle speed, the host vehicle 1 and the potential vehicle 83f collide with each other. In the database 55, the stored data of the level of seriousness of an accident that occurred in the past in a similar travel scene is, for example, "Level of Seriousness=5".

As for the combined blind area 86d that is formed by a potential vehicle blind area 85d for the potential vehicle 83d and a potential vehicle blind area 85e for the potential vehicle 83e, as illustrated at an upper part in FIG. 14, the degree of seriousness of the combined blind area 86d is "4", which the sum of "3" for the level of seriousness of the assumed accident between the potential vehicle 83d and the host vehicle 1 and "1" for the level of seriousness of the assumed accident between the potential vehicle 83e and the host vehicle 1. As for the combined blind area 86e that is formed by the potential vehicle blind areas 85e for the potential vehicle 83e and a potential vehicle blind area 85f for the potential vehicle 83f, as illustrated at a middle part in FIG. 14, the degree of seriousness of the combined blind area 86e is "6", which is the sum of "5" for the level of seriousness of the assumed accident between the potential vehicle 83f and the host vehicle 1 and "1" for the level of seriousness of the assumed accident between the potential vehicle 83e and the host vehicle 1. As for the combined blind area 86f that is formed by the potential vehicle blind areas 85d for the potential vehicle 83d and the potential vehicle blind areas 85f for the potential vehicle 83f, as illustrated at a lower part in FIG. 14, the degree of seriousness of the combined blind area 86f is "8", which is the sum of "3" for the level of seriousness of the assumed accident between the potential vehicle 83d and the host vehicle 1 and "5" for the level of seriousness of the assumed accident between the potential vehicle 83f and the host vehicle 1.

Accordingly, the driving-condition setter 67 selects the path 87fa or the path 87fb for moving the host vehicle 1 to a location outside the combined blind area 86f that has the maximum degree of seriousness. At this time, the driving-condition setter 67 selects the path 87fb that enables movement to a target position 1fb in a shorter time than the other. The driving-condition setter 67 may select the path 87fb by comparing distances from the host vehicle blind area 84f that is caused by the building structure 91 for determination. The driving-condition setter 67 sets the target steering angle, the target acceleration, and the target deceleration for moving the host vehicle 1 along the selected path 87fb and transmits the information about the target steering angle, the target acceleration, and the target deceleration to the vehicle controller 41.

The driving assistance apparatus 50A according to the present embodiment thus sets the target steering angle, the target acceleration, and the target deceleration per cycle of the arithmetic operation and assists in driving the host vehicle 1. This enables the host vehicle 1 to quickly move to the location outside the combined blind area that has the maximum degree of seriousness of the assumed accidents in the case where the number of the host vehicle blind areas 84d, 84e, and 84f for the host vehicle 1 is two or more.

The driving assistance apparatus 50A sequentially performs the process of setting the target steering angle, the target acceleration, and the target deceleration per cycle of the arithmetic operation, and finally causes the host vehicle 1 to move to a location outside the potential vehicle blind areas 85d, 85e, and 85f. Accordingly, a risk of collisions occurring between the host vehicle 1 and the potential vehicles 83d, 83e, and 83f that can be in the respective host vehicle blind areas 84d, 84e, and 84f or the near miss can be reduced. Even when an accident occurs between the potential vehicle 83d, 83e, or 83f and the host vehicle 1, damage due to the accident can be reduced.

Preferred embodiments of the disclosure are described above in detail with reference to the drawings. The technique of the embodiments of the disclosure, however, is not limited thereto. It is clear for a person skilled in the art to conceive various modifications and alterations within the range of technical ideas recited in claims, and these are naturally included in the technical ranges of the embodiments of the disclosure.

Aspects described below are also included in the technical range of the disclosure.

A computer program and a storage medium storing the computer program for causing a processor to perform a process that includes setting potential vehicles in respective host vehicle blind areas that are caused by multiple shrouds located around a host vehicle and that are blind areas for the host vehicle, calculating a combined blind area that is formed by at least two of potential vehicle blind areas that are caused by the multiple shrouds and that are blind areas for the respective potential vehicles, setting multiple paths for moving the host vehicle to a location outside the combined blind area, and setting a driving condition of the host vehicle, based on any one of the multiple paths.

The embodiments of the disclosure described above enable a host vehicle to move to a location at which the host vehicle is likely to be visually recognized from vehicles that can be in respective blind areas when there are multiple blind areas and enable a risk of an accident occurring to be reduced.

The controller 51 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller including the surrounding environment detector 61, the combined-blind-area calculator 63, and the driving-condition setter 65. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A driving assistance apparatus to be applied to a vehicle, the driving assistance apparatus being configured to assist in driving the vehicle, the driving assistance apparatus comprising:
a combined-blind-area calculator configured to
detect surrounding vehicles located around the vehicle based on information transmitted from a surrounding environment sensor that detects a surrounding environment of the vehicle,
set potential vehicles in respective vehicle blind areas that are caused by the surrounding vehicles and that are blind areas for the vehicle, and
calculate a combined blind area that is formed by at least two of potential vehicle blind areas that are caused by the surrounding vehicles and that are blind areas for the respective potential vehicles; and
a driving-condition setter configured to
set multiple paths for moving the vehicle to a location outside the combined blind area, and
set a driving condition of the vehicle, based on any one of the multiple paths,
wherein the combined-blind-area calculator is further configured to set each of the potential vehicles by (1) setting a shape of each of the potential vehicles to be substantially same as a shape of corresponding one of the surrounding vehicles, and (2) setting a position of each of the potential vehicles to be nearest to the vehicle within corresponding one of the vehicle blind areas.

2. The driving assistance apparatus according to claim 1, wherein the driving-condition setter is configured to set the driving condition of the vehicle, based on one of the multiple paths, the one of the multiple paths via which a taken time for moving the vehicle to the location outside the combined blind area is shortest.

3. The driving assistance apparatus according to claim 2, wherein
the combined-blind-area calculator is configured to calculate the combined blind area that is formed by at least two of the potential vehicle blind areas regarding all of combinations of the potential vehicle blind areas, and
the driving-condition setter is configured to
calculate the multiple paths and the taken time regarding all of combined blind areas, each of which is the combined blind area that is formed by at least two of the potential vehicle blind areas, and
select one path from the multiple paths via which the taken time is shortest.

4. The driving assistance apparatus according to claim 1, wherein the driving-condition setter is configured to
obtain a level of seriousness of accidents that may respectively occur between the vehicle and the potential vehicles, the level of seriousness being assumed based on possible driving behavior of the vehicle and possible driving behavior of the potential vehicles, and
select a path for the vehicle, based on the level of seriousness.

5. The driving assistance apparatus according to claim 4, wherein
the combined-blind-area calculator is configured to calculate the combined blind area that is formed by at least two of the potential vehicle blind areas regarding all of combinations of the potential vehicle blind areas, and
regarding every combined blind area, the driving-condition setter is configured to
calculate a degree of seriousness of the combined blind area that is a sum of the level of seriousness of assumed accidents that may respectively occur between the vehicle and the potential vehicles that are set in the potential vehicle blind areas forming the combined blind area, and
select a path for moving the vehicle to a location outside the combined blind area at which the degree of seriousness is largest.

6. A driving assistance apparatus to be applied to a vehicle, the driving assistance apparatus being configured to assist in driving the vehicle and comprising circuitry configured to
detect surrounding vehicles located around the vehicle based on information transmitted from a surrounding environment sensor that detects a surrounding environment of the vehicle,
set potential vehicles in respective vehicle blind areas that are caused by the surrounding vehicles and that are blind areas for the vehicle,
calculate a combined blind area that is formed by at least two of potential vehicle blind areas that are caused by the surrounding vehicles and that are blind areas for the respective potential vehicles,
set multiple paths for moving the vehicle to a location outside the combined blind area, and
set a driving condition of the vehicle, based on any one of the multiple paths,
wherein the circuitry is further configured to set each of the potential vehicles by (1) setting a shape of each of the potential vehicles to be substantially same as a shape of corresponding one of the surrounding vehicles, and (2) setting a position of each of the potential vehicles to be nearest to the vehicle within corresponding one of the vehicle blind areas.

* * * * *